(12) United States Patent
Horiyama (10) Patent No.: US 8,893,151 B2
(45) Date of Patent: Nov. 18, 2014

(54) APPARATUS FOR CONTROLLING JOB HISTORY RECORDING SETTINGS IN AN IMAGE FORMING APPARATUS, AND METHOD AND STORAGE MEDIUM FOR CONTROLLING THE SAME

(75) Inventor: Jun Horiyama, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 12/964,893

(22) Filed: Dec. 10, 2010

(65) Prior Publication Data

US 2011/0161967 A1 Jun. 30, 2011

(30) Foreign Application Priority Data

Dec. 28, 2009 (JP) ................. 2009-298416

(51) Int. Cl.
| | | |
|---|---|---|
| G06F 9/44 | (2006.01) | |
| G06F 3/12 | (2006.01) | |
| H04N 1/44 | (2006.01) | |
| H04N 1/00 | (2006.01) | |
| H04N 1/32 | (2006.01) | |

(52) U.S. Cl.
CPC .......... *H04N 1/4433* (2013.01); *H04N 1/00244* (2013.01); *G06F 3/1222* (2013.01); *G06F 3/1273* (2013.01); *H04N 2201/3202* (2013.01); *H04N 2201/3215* (2013.01); *H04N 2201/0094* (2013.01); *G06F 3/1285* (2013.01); *H04N 1/00344* (2013.01); *H04N 1/4426* (2013.01); *H04N 2201/3221* (2013.01); *H04N 2201/3274* (2013.01); *H04N 2201/3223* (2013.01); *H04N 2201/3226* (2013.01); *H04N 2201/3214* (2013.01); *H04N 2201/0039* (2013.01); *H04N 1/32101* (2013.01)

USPC .................. 719/310; 726/4; 726/28; 358/1.15

(58) Field of Classification Search
None
See application file for complete search history.

(56) References Cited

U.S. PATENT DOCUMENTS

| | | | | |
|---|---|---|---|---|
| 2003/0086111 | A1* | 5/2003 | Akiyoshi | 358/1.14 |
| 2004/0120747 | A1* | 6/2004 | Okochi | 400/76 |
| 2006/0064741 | A1* | 3/2006 | Terao | 726/4 |
| 2006/0187486 | A1 | 8/2006 | Tsuchitoi | 358/1.15 |
| 2006/0268332 | A1 | 11/2006 | Shimada | 358/1.15 |
| 2007/0171466 | A1* | 7/2007 | Shigeeda | 358/1.15 |
| 2008/0018931 | A1* | 1/2008 | Tanaka | 358/1.15 |
| 2008/0192286 | A1* | 8/2008 | Shaw | 358/1.15 |
| 2009/0235261 | A1* | 9/2009 | Ito | 718/102 |
| 2009/0279130 | A1 | 11/2009 | Horiyama | 358/1.15 |

FOREIGN PATENT DOCUMENTS

| | | |
|---|---|---|
| JP | 2006-268837 | 10/2006 |
| JP | 2006-330939 | 12/2006 |

* cited by examiner

*Primary Examiner* — Emerson Puente
*Assistant Examiner* — Paul Mills
(74) *Attorney, Agent, or Firm* — Fitzpatrick, Cella, Harper & Scinto (57) ABSTRACT

When an instruction about changing the job execution limit information is made, a policy server determines whether or not the changed job execution limit information indicates that the execution of the job by the job execution unit is not limited. When the changed job execution limit information indicates that the execution of the job is not limited and the setting is made such that the job history information for the job is recorded on the image processing apparatus, the policy server sets the changed job execution limit information to the image processing apparatus.

5 Claims, 6 Drawing Sheets

| JOB TYPE | JOB CLASSIFICATION | TYPE OF IMAGE DATA | RECORD OF JOB HISTORY INFORMATION | REFERENCE INFORMATION |
|---|---|---|---|---|
| COPY JOB | INPUT JOB | IMAGE DATA | RECORD | - |
| PDL-PRINT JOB | INPUT JOB | IMAGE DATA | DO NOT RECORD | - |
| SCAN JOB/ BOX STORING JOB | INPUT JOB | IMAGE DATA | RECORD | - |
| RECEPTION JOB (FAX/I-FAX) | INPUT JOB | IMAGE DATA | RECORD | - |
| TRANSMISSION JOB (FAX/I-FAX/SEND) | OUTPUT JOB | REFERENCE INFORMATION | RECORD | SCAN JOB/BOX STORING JOB/ RECEPTION JOB (FAX/I-FAX) |
| BOX-PRINT JOB, RECEPTION PRINT JOB | OUTPUT JOB | REFERENCE INFORMATION | RECORD | SCAN JOB/BOX STORING JOB/ RECEPTION JOB (FAX/I-FAX) |

| LOG ID | DOCUMENT ID | JOB TYPE | JOB START TIME | ... |
|---|---|---|---|---|
| 00001 | aaaaa | BOX STORING JOB | 2009/4/1 14:08 | ... |
| 00002 | bbbbb | COPY | 2009/4/10 17:11 | ... |
|  |  |  |  |  |

701

| DOCUMENT ID | IMAGE DATA | ... |
|---|---|---|
| aaaaa | ... | ... |
| bbbbb | ... | ... |
|  |  |  |

JOB HISTORY INFORMATION

APPARATUS FOR CONTROLLING JOB HISTORY RECORDING SETTINGS IN AN IMAGE FORMING APPARATUS, AND METHOD AND STORAGE MEDIUM FOR CONTROLLING THE SAME

BACKGROUND OF THE INVENTION

1. Field of the Invention

The present invention relates to an information processing apparatus, a method for controlling the information processing apparatus, and a storage medium.

2. Description of the Related Art

With the recent prevalence of printers and digital multifunction devices, anyone can easily execute a printing, copying, and FAX transmitting process via a host computer. While the convenience of printing or the like brings has been improved, a new problem of information leakage through printing, copying, or transmitting of confidential original documents arises. As an information leakage countermeasure, there has been proposed a job history information management system including a digital multifunction device and a server, wherein the system stores job history information in a storage device when a job such as a printing, copying, FAX, electronic mail transmission process, and the like is executed. The job history information includes, for example, information about the user who has executed the job, information about the job execution date and time, information for identifying the digital multifunction device by which the job has been executed (e.g., IP address or serial number), and the type of the executed job. IP is an abbreviation for "Internet Protocol". The job history information also includes, for example, the image data for an input image and the reduced image data in which the image data has been reduced.

A database is installed on the server that is included in the job history information management system. The job history information, which has been recorded on the digital multifunction device, is transmitted to the server and stored in the database. The server stores the job history information for a predetermined time period in the database to make it retrievable, whereby, when information leakage has been found, the server can retroactively trace the job history information.

Also, there has been proposed a method for reducing the storage capacity required for storing job history information to thereby store more job history information efficiently. Japanese Patent Laid-Open No. 2006-330939 discloses an image processing apparatus in which the type of a job to be executed (hereinafter referred to as "job type") is specified, and for a job of a predetermined job type, the reference information for an image as a substitute for the actual image is stored in a storage unit. According to the image processing apparatus, the data amount to be stored in the storage unit can be reduced. The job type is the type of each job such as, for example, printing, copying, FAX transmission, FAX reception, electronic mail transmission, and the like.

As another information leakage countermeasure, Japanese Patent Laid-Open No. 2006-268837 discloses an image forming apparatus in which limit information, which limits the execution of a print job, is acquired, and the execution of the job, i.e., print settings for the print job, is limited in accordance with the limit information.

An image processing apparatus described above is contemplated, including a function possessed by a system that holds job history information depending on a job type, and a function possessed by an apparatus that limits the execution of a job in accordance with information that limits the execution of the job. However, in the image processing apparatus, the timing at which the job execution limit is set in the image processing apparatus may be different from the timing at which the settings for recording job history information depending on the job type are made. In this case, any failure in acquiring job history information may occur as follows. For example, assume the case where the job execution limit, which has been set in the image processing apparatus, is removed. When the image processing apparatus executes a job immediately after the removal of the job execution limit, job history information is not recorded, if the settings for recording job history information are not made for the image processing apparatus. Thus, for example, a server cannot acquire job history information from the image processing apparatus.

SUMMARY OF THE INVENTION

An information processing apparatus of one aspect of the present invention is the information processing apparatus that manages an execution history of a job relating to image processing. The information processing apparatus includes a job execution unit configured to execute the job; a first setting unit configured to set job execution limit information, which relates to the limit of the job execution by the job execution unit, to the job execution unit; and a second setting unit configured to set job history record setting information, which indicates whether or not job history information indicating the execution history of the job is to be recorded on the job execution unit upon execution of the job, to the job execution unit. When an instruction about changing the job execution limit information is made, the first setting unit determines whether or not the changed job execution limit information indicates that the execution of the job by the job execution unit is not limited; when the changed job execution limit information indicates that the execution of the job is not limited, the first setting unit determines whether or not the job history record setting information corresponding to the job set in the job execution unit indicates that the job history information is to be recorded on the job execution unit; and when the job history record setting information corresponding to the job set in the job execution unit indicates that the job history information is to be recorded on the job execution unit, the first setting unit sets the changed job execution limit information to the job execution unit.

Further features of the present invention will become apparent from the following description of exemplary embodiments with reference to the attached drawings.

DESCRIPTION OF THE EMBODIMENTS

Figure 1:
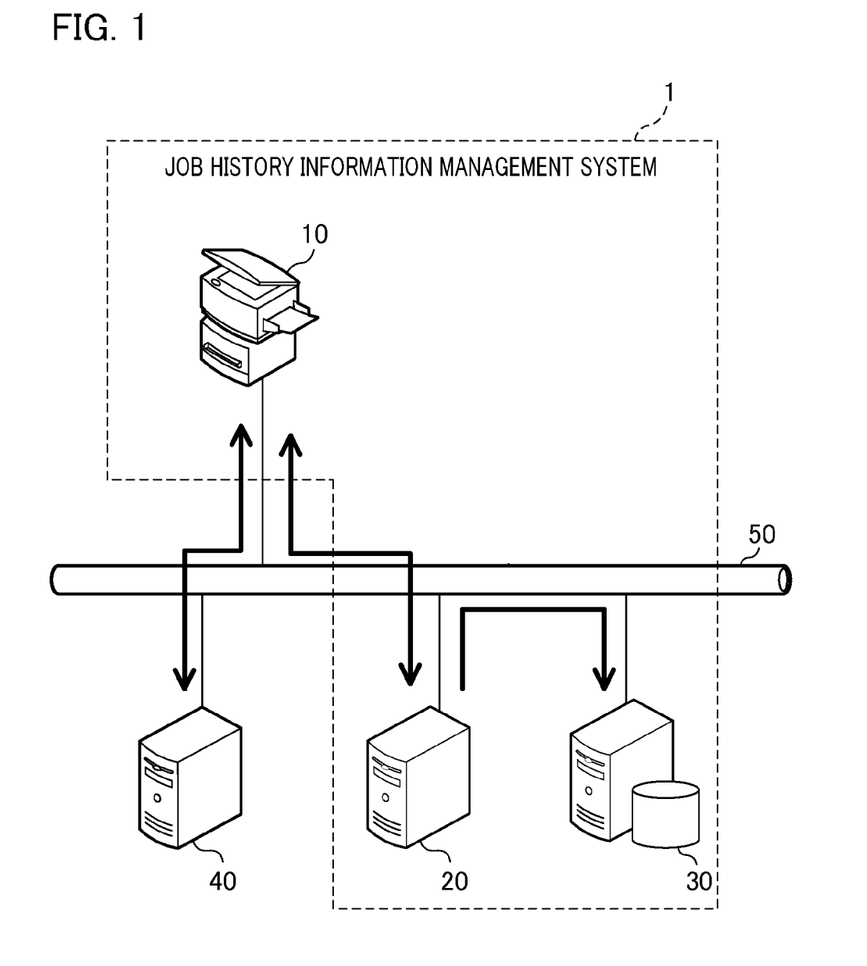
FIG. 1 is a diagram showing an example of the system configuration of the present embodiment.

FIG. 1 is a diagram showing an example of the system configuration of the present embodiment. The system shown in FIG. 1 includes a job history information management system 1 and a policy server 40 which is connected with the job history information management system 1 via a network 50. The job history information management system 1 manages the execution history of the job executed by an image forming apparatus 10 to be described below. In the present embodiment, the job history information management system 1 may be a single information processing apparatus which is connected with the policy server 40 via the network 50. The single information processing apparatus having a similar function as that of the job history information management system 1 is the information processing apparatus of the present embodiment. Also, a method for controlling the information processing apparatus of the present embodiment and its storage medium are realized by the function of the information processing apparatus.

The policy server 40 functions as a first setting unit configured to set job execution limit information, i.e., control information, which relates to the limit of the job execution by the image forming apparatus 10, to the image forming apparatus 10. More specifically, the job execution limit information indicates either that the execution of a job by the image forming apparatus 10 is limited or indicates that the execution of the job by the image forming apparatus 10 is not limited. The job execution limit information is set for every user and for every job.

The job history information management system 1 includes an image forming apparatus 10, an image processing server 20, and a data server 30. The image forming apparatus 10 functions as a job execution unit configured to execute a job. The image forming apparatus 10 executes a job relating to image processing such as, for example, scanning, printing, copying, FAX transmitting, and the like. The image forming apparatus 10 has a function called as a user box that stores image data in a predetermined storage unit, and transmits the image data stored in the user box via FAX or electronic mail.

When the job execution limit information set by the policy server 40 indicates that the execution of the job is not limited, the image forming apparatus 10 can execute the job. Also, the image forming apparatus 10 records job history information indicating the execution history of the executed job in accordance with the job history record setting information set by the image processing server 20 to be described below, and transmits the job history information to the data server 30 to be described below.

The job history record setting information is control information indicating whether or not the job history information indicating the execution history of the job is to be recorded on the image forming apparatus 10 upon execution of the job. Also, the job history information is information including image data and a log thereof. Examples of image data include the image data input to the image forming apparatus 10 and the reduced image data in which the input image data has been reduced. The log includes, for example, information about the user who has executed the job, information about the job execution date and time, information for identifying the image forming apparatus 10 by which the job has been executed (IP address, serial number, and the like), and the type of the executed job.

For example, when an input job is executed, the image forming apparatus 10 transmits the job history information including the image data, which has been input to the image forming apparatus 10, to the data server 30 via the image processing server 20. The input job is a job through which image data is input to the image forming apparatus 10 upon execution of the job by the image forming apparatus 10. Also, when an output job is executed, the image forming apparatus 10 transmits the log including the reference information about the image data, which has been transmitted to the data server 30 upon execution of the input job, to the data server 30 via the image processing server 20. The output job is a job through which the image data, which has been input to the image forming apparatus 10 by the input job, is output.

The image processing server 20 functions as a second setting unit configured to set job history record setting information to the image forming apparatus 10. Also, the image processing server 20 transmits job history record information, which is set in the image forming apparatus 10, to the data server 30. Furthermore, the image processing server 20 receives job history information from the image forming apparatus 10, and transmits the received job history information to the data server 30. More specifically, the image processing server 20 performs predetermined data conversion processing on the image data included in the job history information received from the image forming apparatus 10, and transmits the job history information including the image data subjected to data conversion processing to the data server 30. Data conversion processing is, for example, a process in which image data is subjected to OCR processing to thereby extract text information or convert the format of image data. OCR is an abbreviation for "Optical Character Recognition".

The data server 30 receives the job history information, which has been transmitted from the image forming apparatus 10, for management. The data server 30 may store the text information included in the job history information in a manner associated with the job history information. With this arrangement, the data server 30 can search the job history information based on the text information. Also, the data server 30 receives the job history record setting information, which has been transmitted from the image processing server 20, for management. The data server 30 deletes the job history information for which a predetermined time period has elapsed. The data server 30 deletes the job history information, for example, once per day.

The operation specific to the policy server 40 shown in FIG. 1 of the present embodiment will now be described below. The policy server 40 determines whether or not an instruction about changing the job execution limit information is made based on a user's operation input. When an instruction about changing the job history record setting information is made, the policy server 40 determines whether or not the changed job execution limit information indicates that the execution of the job by the image forming apparatus 10 is not limited. When the changed job execution limit information indicates that the execution of the job is not limited, the policy server 40 determines whether or not the job history record setting information corresponding to the job set in the image forming apparatus 10 indicates that the job history information is to be recorded on the image forming apparatus 10. Then, when the job history record setting information corresponding to the job set in the image forming apparatus 10 indicates that the job history information is to be recorded on the image forming apparatus 10, the policy server 40 sets the changed job execution limit information in the image forming apparatus 10.

More specifically, the policy server 40 acquires the job execution history record information corresponding to the job from the data server 30 via the image processing server 20, and determines whether or not the job execution history record information indicates that the job history information is to be recorded on the image forming apparatus 10. When the job execution history record information indicates that the job history information is to be recorded on the image forming apparatus 10, the policy server 40 determines whether or not the job execution history record information is actually set in the image forming apparatus 10. When the job execution history record information is actually set in the image forming apparatus 10, the policy server 40 sets the changed job execution limit information to the image forming apparatus 10.

The operation specific to the image processing server 20 shown in FIG. 1 of the present embodiment will now be described below. The image processing server 20 determines whether or not an instruction about changing the job history record setting information is made based on a user's operation input. When an instruction about changing the job history record setting information is made, the image processing server 20 determines whether or not the changed job history record setting information indicates that the job history information is not to be recorded on the image forming apparatus 10. When the changed job history record setting information indicates that the job history information is not to be recorded on the image forming apparatus 10, the image processing server 20 determines whether or not the execution of the job corresponding to the job history information is limited with reference to the job execution limit information. When the execution of the job corresponding to the job history information is not limited, the image processing server 20 stops the change of the job history record setting information.

Figure 2:
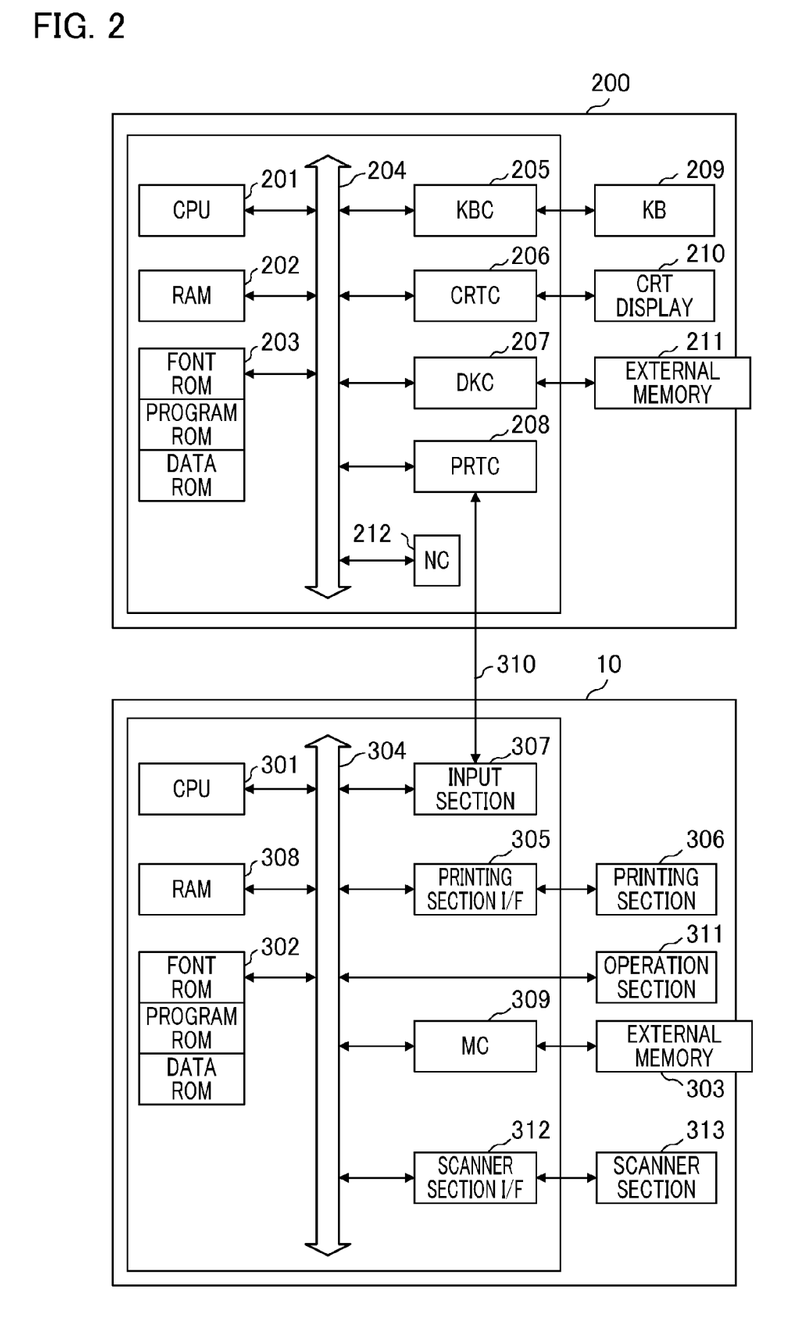
FIG. 2 shows an example of the hardware configuration of the system of the present embodiment.

FIG. 2 shows an example of the hardware configuration of the system of the present embodiment. A computer 200 shown in FIG. 2 is a computer, each of which constitutes the image processing server 20, the data server 30, and the policy server 40 shown in FIG. 1. First, the hardware configuration of the computer 200 will be described. A CPU (Central Processing Unit) 201 controls the processing units that are connected to the system bus 204 via a system bus 204. More specifically, the CPU 201 executes a control program stored in a program ROM included in a ROM 203, or a program such as an OS, application, or the like which has been loaded from a hard disk 211 to a RAM 202. ROM is an abbreviation for "Read Only Memory". RAM is an abbreviation for "Random Access Memory". OS is an abbreviation for "Operating System".

The ROM 203 includes a font ROM, a program ROM, and a data ROM. Font data is stored in the font ROM in advance. A control program for controlling the computer 200 is stored in the program ROM in advance. Data required for the execution of the control program stored in the program ROM is stored in the data ROM in advance.

The RAM 202 functions as a main memory for the CPU 201, a work area, and the like of the CPU 201. A keyboard controller (Keyboard Controller: KBC) 205 controls key input from a keyboard (KB) 209 or a pointing device. A CRT controller (Cathode Ray Tube Controller: CRTC) 206 controls display of a CRT display 210. A disk controller (Disk controller: DKC) 207 controls data access between an external memory 211 for storing various data and the CPU 201. The external memory 211 includes, for example, a hard disk (Hard Disk: HD) 211, a floppy disk (Floppy Disk: FD), and the like. Floppy is a registered trademark. A PRTC (Printer Controller) 208 controls signal exchange with the image forming apparatus 10 connected thereto. A NC (Network Controller) 212 is connected to a network, and executes communication control processing with other devices which are connected to a network.

Next, the hardware configuration of the image forming apparatus 10 will be described. A CPU 301 entirely controls the overall image forming apparatus 10. More specifically, the CPU 301 controls the processing units connected to a system bus 304 based on a program or the like which is stored in a ROM 302 and an external memory 303. For example, the CPU 301 executes a job relating to image processing to generate image data. The CPU 301 outputs the generated image data as output information to a printing unit 306 via a printing unit I/F (Interface) 305. Also, the CPU 301 executes communication processing with a host computer 200 via an input unit 307. More specifically, the input unit 307 notifies the host computer 200 about information or the like stored in the image forming apparatus 10 in accordance with an instruction from the CPU 301. In addition, an input unit 107 inputs the information, which has been transmitted from the PRTC 208 of the computer 200, to the image forming apparatus 10.

The ROM 302 includes a program ROM, a font ROM, a program ROM, and a data ROM. A control program for controlling the image forming apparatus 10 is stored in the program ROM in advance. Font data or the like for use in generating output information is stored in the font ROM in advance. A control program for controlling the image forming apparatus 10 is stored in the program ROM in advance. Data required for the execution of the control program stored in the program ROM is stored in the data ROM in advance.

The RAM 308 functions as a main memory for the CPU 301, a work area, and the like. The RAM 308 is configured such that memory capacity can be increased by an optional RAM which is connected to an additional port. Also, the RAM 308 is used for an output information expansion region, an environmental data storage region, an NVRAM (Non Volatile Random Access Memory), and the like. A memory controller (Memory Controller: MC) 309 controls access to the external memory 303. The external memory 303 stores, for example, font data, an emulation program, form data, and the like. The external memory 303 is connected to the memory controller 309 as an option. An operation unit 311 inputs the information corresponding to a user's operation input. The operation unit 311 includes a switch, an LED (Light Emitting Diode) display, and the like for a user's operation input.

A scanner unit I/F 312 performs correcting, processing, and editing of the image data read by a scanner unit 313. The scanner unit 313 inputs the reflected light obtained by exposure scanning of an image on an original to a CCD to thereby convert image information to an electrical signal. CCD is an abbreviation for "Charge Coupled Device". Also, the scanner unit 313 converts the converted electrical signal to a luminance signal consisting of red (R), green (G), and blue (B), and reads the luminance signal as image data. When a user provides an instruction to start reading from the operation unit 311, an original read instruction is provided to the scanner unit 313. The scanner unit 313 performs an original read operation in accordance with the original read instruction. An exemplary method for reading an original is an automatic feeding method for setting an original on an original feeder. A method for reading an original may be a method for placing an original on a glass surface and moving an exposure unit to thereby scan the original.

Figure 3:
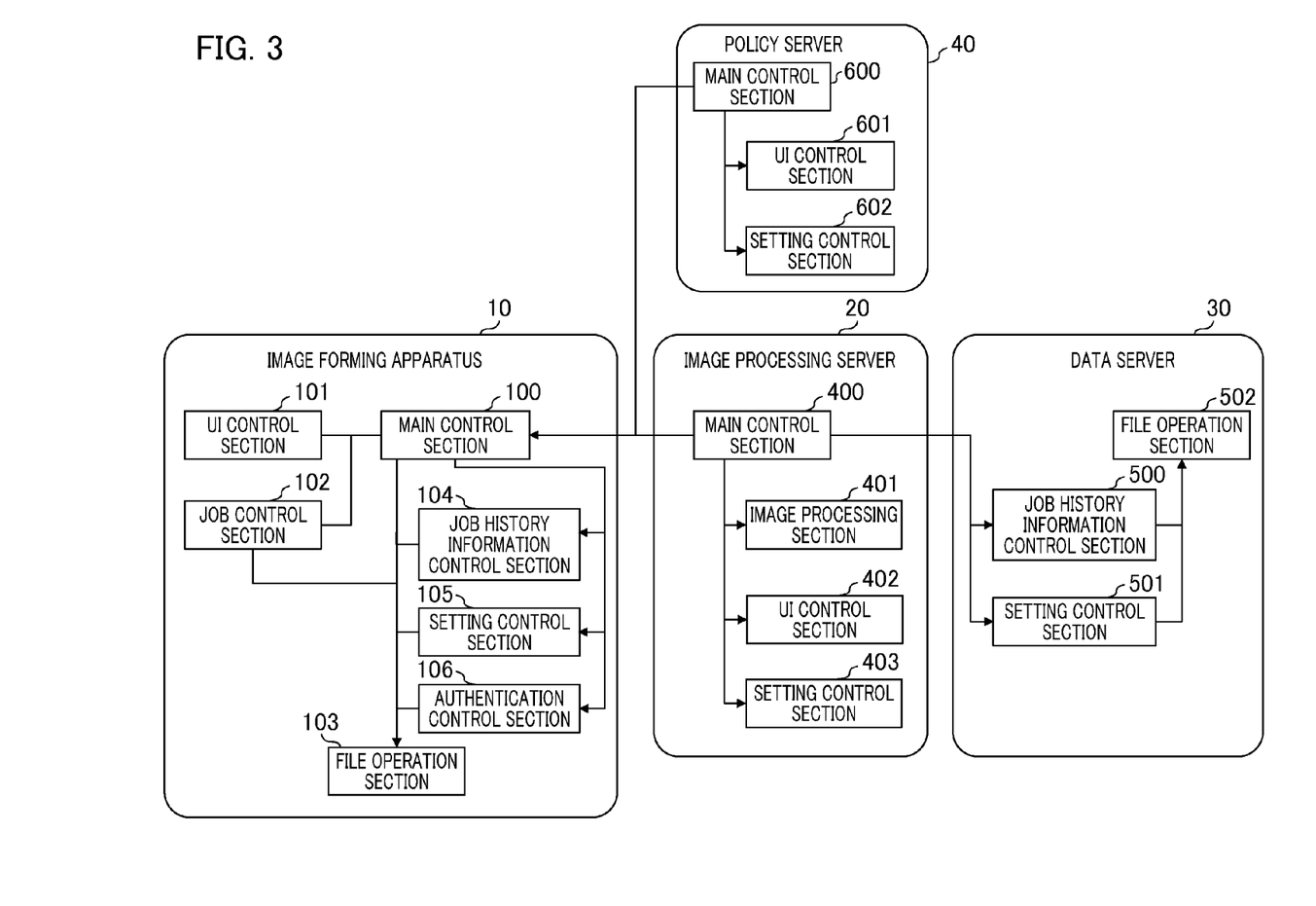
FIG. 3 shows an example of a functional block diagram of the system of the present embodiment.

FIG. 3 shows an example of a functional block diagram of the system of the present embodiment. An image forming apparatus 10 shown in FIG. 3 includes a main control unit 100, an UI (User Interface) control unit 101, and a job control unit 102. The image forming apparatus 10 further includes a file operation unit 103, a job history information control unit 104, a setting control unit 105, and an authentication control unit 106.

The main control unit 100 controls the entire image forming apparatus 10, and provides an instruction and management for the processing units provided in the image forming apparatus 10. For example, the main control unit 100 provides a job execution instruction to the job control unit 102 in accordance with a user's instruction content input by the UI control unit 101. The job execution instruction is an instruction for the execution of the job. Also, when the job is executed, the main control unit 100 provides a job history information generation instruction to the job history information control unit 104. The job history information generation instruction is an instruction for the generation of the job history information corresponding to the executed job. The main control unit 100 also receives the job history record setting information from the main control unit 400 of the image processing server 20, and sets the received job history record setting information to the setting control unit 105. The main control unit 100 also receives the job execution limit information from the main control unit 600 of the policy server 40, and sets the received job execution limit information to the authentication control unit 106. The main control unit 100 also transmits the job history record setting information to the main control unit 400 in response to a query from the main control unit 400 of the image processing server 20.

The main control unit 100 also transmits the job history information, which has been generated by the job history information control unit 104, to the main control unit 400 of the image processing server 20. The main control unit 100 also transmits the job history record setting information, which has been set in the setting control unit 105, to the main control unit 400 of the image processing server 20. The UI control unit 101 controls processing relating to a user operation, which is performed by the image forming apparatus 10. More specifically, the UI control unit 101 displays a user interface on the operation unit 311 (see FIG. 2), and passes the user's operation input content using the user interface to the main control unit 100.

The job control unit 102 receives the job execution instruction corresponding to the user's operation input via the main control unit 100 to thereby execute the job. When the job control unit 102 has received the job execution instruction, the job control unit 102 operates as follows. When the job execution limitation information, which has been set in the authentication control unit 106, indicates that the execution of the job by the image forming apparatus 10 is not limited, the job control unit 102 executes the job. On the other hand, when the job execution limitation information, which has been set in the authentication control unit 106, indicates that the execution of the job by the image forming apparatus 10 is limited, the job control unit 102 does not execute the job. To this end, the main control unit 100 changes the control state of the UI control unit 101 and the job control unit 102 based on the job execution limit information. For example, when the main control unit 100 receives the job execution limit information "the FAX transmission operation is not permitted for the user A", the control state of the UI control unit 101 is changed to the state where the UI for FAX transmission is not displayed. Also, the main control unit 100 changes the control state of the job control unit 102 to the state where a FAX transmission job is prohibited by setting the job execution limit information to the authentication control unit 106.

The file operation unit 103 performs input/output control of a program stored in the external memory 303. Also, the file operation unit 103 performs input/output control of the job history information managed by the job history information control unit 104. The job history information control unit 104 generates job history information in accordance with a job history information generation instruction given by the main control unit 100. When the job history information control unit 104 has received the job history information generation instruction, the job history information control unit 104 operates as follows. When the job history record setting information set in the setting control unit 105 indicates that the job history information is to be recorded on the image forming apparatus 10, the job history information control unit 104 generates job history information. The job history information control unit 104 records the generated job history information. Also, the job history information control unit 104 transmits the job history information to the job history information control unit 500 of the data server 30 via the main control unit 100 and the main control unit 400 of the image processing server 20. When the job history record setting information set in the setting control unit 105 indicates that the job history information is not to be recorded on the image forming apparatus 10, the job history information control unit 104 does not generate job history information. The setting control unit 105 manages setting information for the operating conditions relating to the image forming apparatus 10. For example, the setting control unit 105 manages the job execution limit information set by the main control unit 100. The authentication control unit 106 manages the job execution limit information set in the authentication control unit 106.

The image processing server 20 includes the main control unit 400, an image processing unit 401, an UI control unit 402, and a setting control unit 403. The main control unit 400 controls the entire image processing server 20. For example, the main control unit 400 generates job history record setting information depending on a user's operation input to cause the setting control unit 403 to manage the job history record setting information. The main control unit 400 also transmits the generated job history setting information to the setting control unit 501 of the data server 30. The main control unit 400 also periodically transmits the job history setting information, which has been transmitted to the setting control unit 501 of the data server 30, to the main control unit 100 of the image forming apparatus 10. The main control unit 400 also receives the job history information from the image forming apparatus 10.

The main control unit 400 queries the main control unit 100 of the image forming apparatus 10 about the job history record setting information in accordance with the instruction given by the main control unit 600 of the policy server 40. Then, the main control unit 400 receives the job history record setting information from the main control unit 100, which has made a response to the query, of the image forming apparatus 10, and transmits the job history record setting information to the main control unit 600 of the policy server 40. The main control unit 400 also queries the setting control unit 501 of the data server 30 about the job history record setting information in accordance with the instruction given by the main control unit 600 of the policy server 40. Then, the main control unit 400 receives the job history record setting information from the setting control unit 501, which has made a response to the query, of the data server 30, and transmits the job history record setting information to the main control unit 600 of the policy server 40.

The main control unit 400 determines whether or not an instruction about changing the job history record setting information is made based on a user's operation input. When an instruction about changing the job history record setting information is made, the main control unit 400 determines whether or not the changed job history record setting information indicates that the job history information is not to be recorded on the image forming apparatus 10. When the changed job history record setting information indicates that the job history information is not to be recorded on the image forming apparatus 10, the main control unit 400 determines whether or not the execution of the job corresponding to the job history information is limited with reference to the job execution limitation information. When the execution of the job corresponding to the job history information is not limited, the main control unit 400 stops the transmission of the changed job history record setting information to the image forming apparatus 10. With this arrangement, the change in the job history record setting information set in the image forming apparatus 10 is stopped.

The image processing unit 401 performs predetermined data conversion processing on the image data included in the job history information, which has been received from the main control unit 100 of the image forming apparatus 10, in accordance with the instruction given by the main control unit 400. The main control unit 400 transmits the job history information including the image data subjected to data conversion processing to the job history information control unit 500 of the data server 30. The UI control unit 402 causes the CRT display 210 of the image processing server 20 to display a user interface to thereby receive a user's operation input. The setting control unit 403 manages setting information for the operating conditions relating to the image processing server 20. For example, the setting control unit 403 manages the job execution limit information in accordance with the instruction given by the main control unit 400.

The data server 30 includes a job history information control unit 500, a setting control unit 501, and a file operation unit 502. The job history information control unit 500 receives job history information from the main control unit 100 of the image forming apparatus 10 via the main control unit 400 of the image processing server 20 for management. Also, the setting control unit 501 receives job history record setting information from the main control unit 400 of the image processing server 20 for management. The file operation unit 502 performs a file operation relating to job history information.

The policy server 40 includes a main control unit 600, an UI control unit 601, and a setting control unit 602. The main control unit 600 controls the entire policy server 40. The main control unit 600 generates job execution limit information depending on a user's operation input to cause the setting control unit 602 to manage the job execution limit information. The main control unit 600 also transmits the job execution limit information to the main control unit 100 of the image forming apparatus 10.

When an instruction about changing the job execution limitation information is made in accordance with a user's operation input, the main control unit 600 determines whether or not the changed job execution limit information indicates that the execution of the job is not limited, i.e., the execution of the job is permitted. When the changed job execution limit information indicates that the execution of the job is permitted, the main control unit 600 performs the following processing. The main control unit 600 provides an instruction to the main control unit 400 of the image processing server 20 about the transmission of the job history record setting information, which is managed by the setting control unit 501 of the data server 30, corresponding to a job whose execution is permitted. The main control unit 600 acquires the job history record setting information managed by the setting control unit 501 from the image processing server 20, and determines whether or not the job history record setting information indicates that the job history information is to be recorded on the image forming apparatus 10. When the job history record setting information is to be recorded on the image forming apparatus 10, the main control unit 600 performs the following processing. The main control unit 600 provides an instruction to the main control unit 400 of the image processing server 20 about the transmission of the job history record setting information, which is set in the setting control unit 105 of the image forming apparatus 10, corresponding to the job whose execution is permitted. The main control unit 600 acquires the job history record setting information set in the setting control unit 105 from the image processing server 20, and determines whether or not the job history record setting information indicates that the job history information is to be recorded on the image forming apparatus 10. When the job history record setting information indicates that the job history information is to be recorded on the image forming apparatus 10, the main control unit 600 updates the job history information managed by the setting control unit 602 to the changed job history information. Also, the main control unit 600 provides an instruction to the main control unit 100 of the image forming apparatus 10 to cause the main control unit 100 to set the changed job execution limit information to the authentication control unit 106.

The UI control unit 601 causes the CRT display 210 of the policy server 50 to display a user interface to thereby receive a user's operation input. The setting control unit 602 manages the job execution limit information in accordance with the instruction given by the main control unit 600.

Figure 4A:
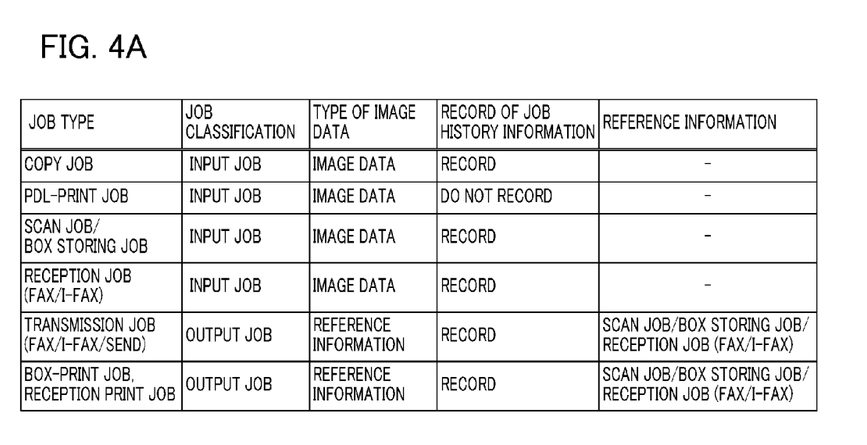
FIG. 4A is a diagram showing an example of information relating to a job to be executed by an image forming apparatus.
Figure 4B:
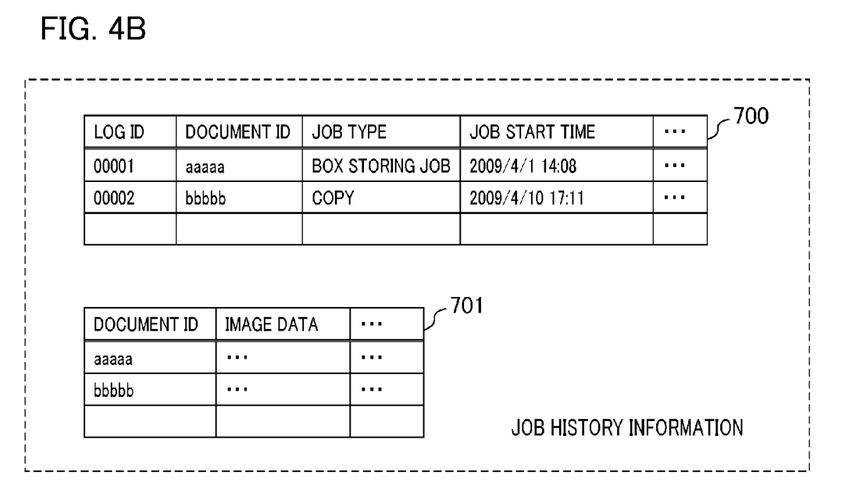
FIG. 4B is a diagram showing an example of job history information.

FIGS. 4A and 4B are diagrams showing an example of information relating to a job to be executed by an image forming apparatus and job history information. FIG. 4A shows information relating to a job to be executed by the image forming apparatus 10. The job type shown in FIG. 4A denotes the type of a job. The term "job classification" denotes whether a job is either an input job or an output job. The term "type of image data" denotes the type of image data corresponding to a job. The term "recording of job history information" denotes whether job history information is to be recorded or not to be recorded. More specifically, the term "recording of job history information" shown in FIG. 4A denotes a content of the job history record setting information set in the setting control unit 105 of the image forming apparatus 10. The term "reference information" denotes the information about an input job which could be the reference information about an output job.

For example, a COPY job is an input job in which the original read by the scanner unit 313 is an input image. The image forming apparatus 10 executes the input job, and records the log and image data as job history information. At this time, the image forming apparatus 10 allocates the document ID, i.e., the identification information for uniquely identifying image data.

For example, a BOX-PRINT job is an output job. The BOX-PRINT job performs printing by using the image data stored in a user box by execution of the BOX storing job. When executing the output job, the image forming apparatus 10 records the document ID of the used image data as reference information, instead of image data.

Even when the job history record setting information corresponding to the input job indicates that the job history information is not to be recorded, the image forming apparatus 10 still records the job history information about the input job, if the input job is the reference information about the output job. For example, referring now to FIG. 4A, a SCAN job/BOX storing job can be the reference information about a transmission job (FAX/I-FAX/SEND). Thus, even when the job history record setting information corresponding to the SCAN job/BOX storing job indicates that the job history information is not to be recorded, the image forming apparatus 10 records the job history information about the SCAN job/BOX storing job.

FIG. 4B shows an example of job history information. In FIG. 4B, a description will be given taking the example of the job history information managed by the job history information control unit 500 of the data server 30. The job history information includes a log 700 and an image data 701. The log 700 includes a log ID, a document ID, a job type, a job start time, and the like. The log ID denotes identification information for uniquely identifying a log. The document ID denotes identification information for uniquely identifying a document corresponding to the log. The job type denotes the type of a job corresponding to the log. The job start time denotes the time at which the execution of a job is started. The image data 701 includes a document ID and image data. The document ID denotes identification information for uniquely identifying a document. The image data denotes the image data corresponding to the document ID. For example, the BOX storing job, i.e., the job corresponding to the log of which the log ID is "00001", is an input job. Thus, the job history information control unit 500 of the data server 30 manages the image data, which corresponds to the job, of which the document ID is "aaaaa".

Figure 5:
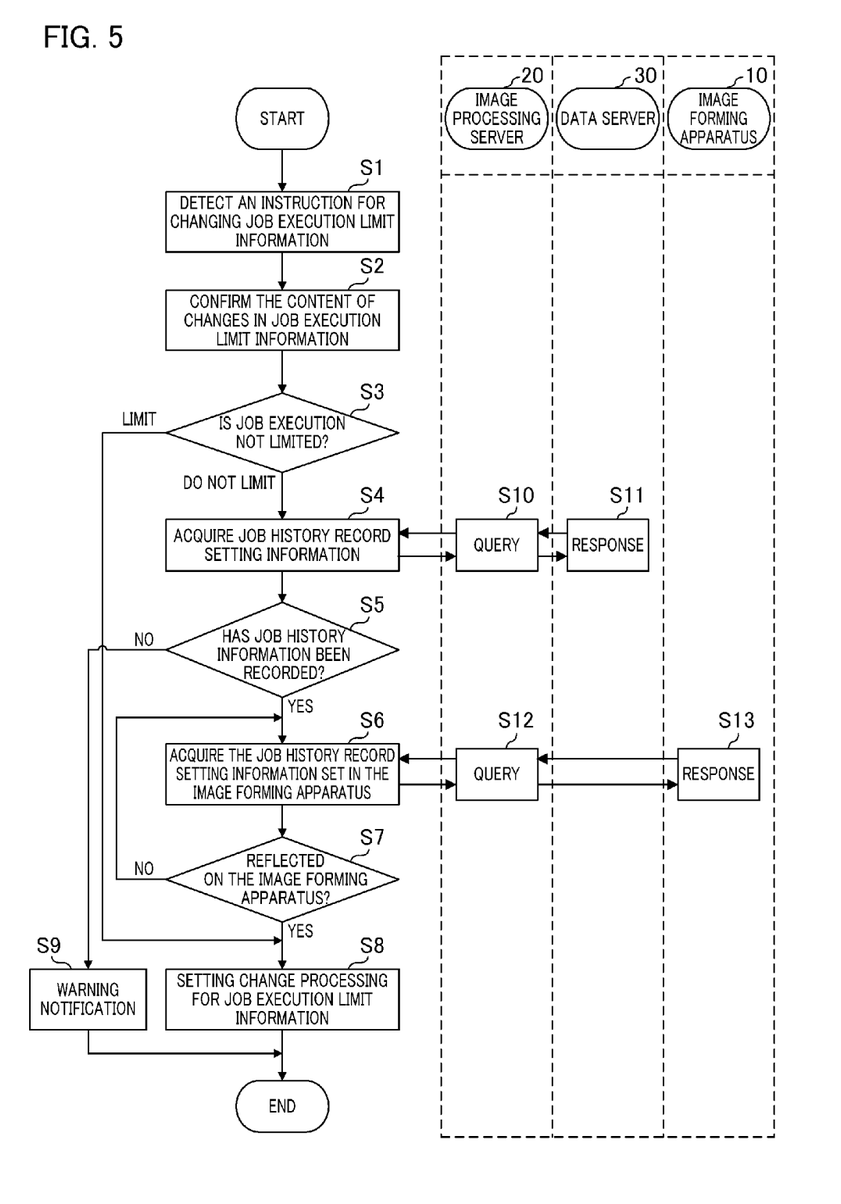
FIG. 5 is an example of a flowchart illustrating change processing of job execution limitation information.

FIG. 5 is an example of a flowchart illustrating change processing of job execution limitation information to be executed by a policy server. First, the main control unit 600 of the policy server 40 detects that an instruction for changing job execution limit information has been made in accordance with a user's operation input (step S1). Next, the main control unit 600 confirms the content of changes in job execution limit information (step S2). In other words, the main control unit 600 determines whether or not the changed job execution limit information indicates that the execution of the job is not limited (step S3).

When the main control unit 600 determines that the changed job execution limit information indicates that the execution of the job is limited, the main control unit 600 performs setting change processing for job execution limit information (step S8). More specifically, the main control unit 600 updates the job execution limit information managed by the setting control unit 602 to the changed job execution limit information. Also, the main control unit 600 provides an instruction to the main control unit 100 of the image forming apparatus 10 to cause the main control unit 100 to set the changed job execution limit information to the authentication control unit 106. When the changed job execution limit information indicates that the execution of the job is limited, new job history information is not generated by changing the job limit information. Thus, no failure in acquiring the job history information by the data server 30 will occur.

When the main control unit 600 determines that the changed job execution limit information indicates that the execution of the job is not limited, i.e., the execution of the job is permitted, the main control unit 600 acquires the job history record setting information corresponding to the job (step S4). More specifically, the main control unit 600 provides an instruction to the main control unit 400 of the image processing server 20 about the transmission of the job history record setting information corresponding to the job. The main control unit 400, which has received the instruction, of the image processing server 20 queries the data server 30 about the job history record setting information (step S10). The setting control unit 501 of the data server 30 makes a response to the query, and transmits the job history record setting information to the main control unit 400 of the image processing server 20. The main control unit 400 of the image processing server 20 receives the job history record setting information, which has been transmitted from the data server 30, and transmits the job history record setting information to the main control unit 600 of the policy server 40. With this arrangement, for example, when the changed job execution limit information indicates that a FAX transmission is permitted for a user, the main control unit 600 acquires the job history record setting information corresponding to the FAX transmission.

Next, the main control unit 400 determines whether or not the acquired job history record setting information indicates that the job history information for a job that is permitted for execution is to be recorded (step S5). For example, the main control unit 400 determines whether or not the job history record setting information corresponding to the FAX transmission indicates that the job history information corresponding to the FAX transmission is to be recorded.

When the acquired job history record setting information indicates that the job history information for a job that is permitted for execution is not to be recorded, the main control unit 600 provides a warning notification to a user (step S9), and ends the processing without changing the job execution limit information. The main control unit 600 provides a warning notification, via, for example, a mail notification sent to a predetermined administrator, a UI display to the CRT display 210 of the policy server 40, or the like. In other words, when the job history record setting information, which has been set in the image forming apparatus 10, indicates that the job history information is not to be recorded on the image forming apparatus 10, the policy server 40 stops the change of the job execution limit information.

When the acquired job history record setting information indicates that the job history information for a job that is permitted for execution is to be recorded, the main control unit 600 acquires the job history record setting information corresponding to the job that is set in the image forming apparatus 10 (step S6). More specifically, the main control unit 600 provides an instruction to the main control unit 400 of the image processing server 20 about the transmission of the job history record setting information. The main control unit 400, which has received the instruction, of the image processing server 20 queries the image forming apparatus 10 about the job history record setting information (step S12). The main control unit 100 of the image forming apparatus 10 makes a response to the query (step S 13), and transmits the job history record setting information to the main control unit 400 of the image processing server 20. The main control unit 400 of the image processing server 20 receives the job history record setting information, which has been transmitted from the image forming apparatus 10, and transmits the job history record setting information to the main control unit 600 of the policy server 40.

Next, the main control unit 600 determines whether or not the job history record setting information, which has been acquired in step S6, indicates that the job history information is to be recorded (step S7). In other words, the main control unit 600 determines whether or not the content of the job history record setting information managed by the data server 30 is reflected in the image forming apparatus 10. When the job history record setting information, which has been acquired in step S6, indicates that the job history information is not to be recorded, the process returns to step S6. When the job history record setting information, which has been acquired in step S6, indicates that the job history information is to be recorded, the process advances to step S8, and the main control unit 600 performs setting change processing for the job execution limitation information.

According to the process performed by the policy server 40 described with reference to FIG. 5, the job execution limit information indicating that the execution of the job is not limited is set in the image forming apparatus 10 after the job history record setting information indicating that the job history information is to be recorded is set in the image forming apparatus 10. Thus, any failure in acquiring the job history information obtained from the image forming apparatus 10 by the data server 30 can be prevented.

Figure 6:
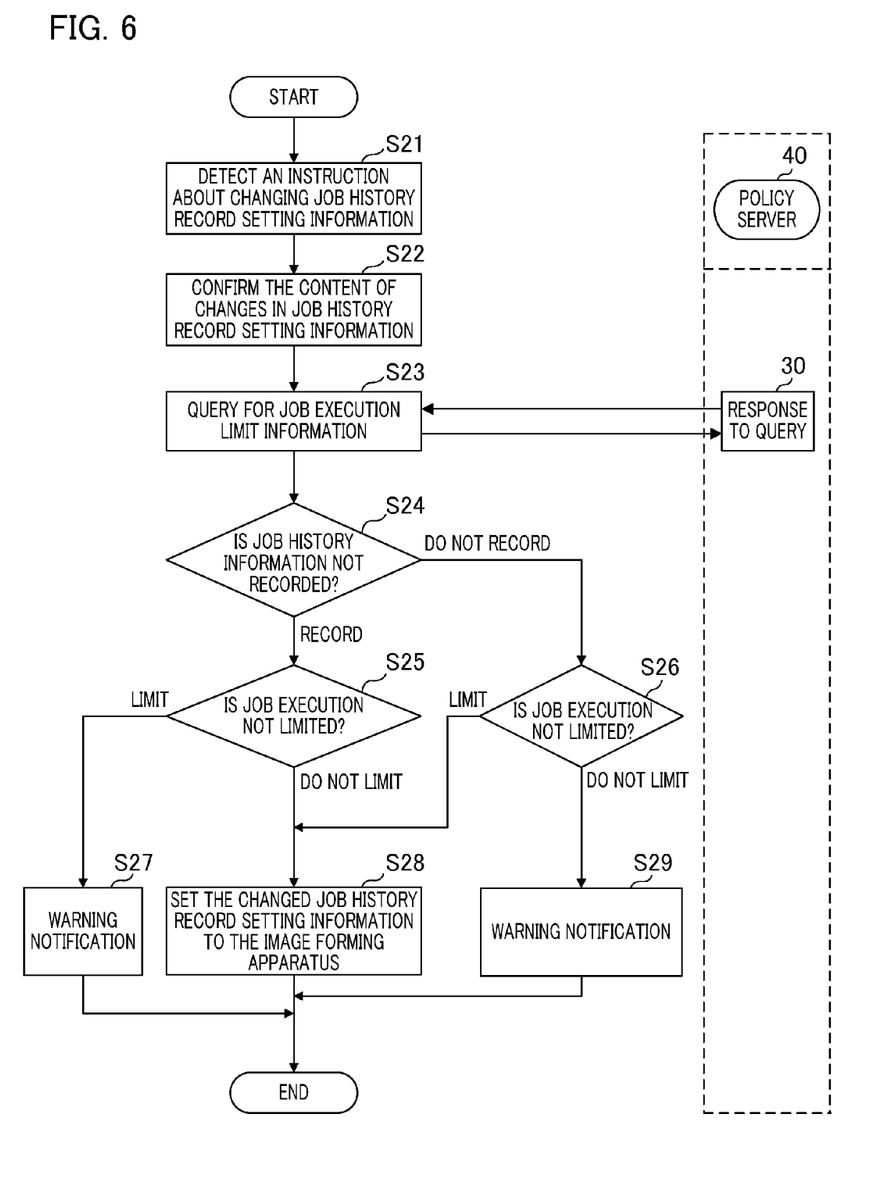
FIG. 6 is an example of a flowchart illustrating change processing of job history record setting information.

FIG. 6 is an example of a flowchart illustrating change processing of job history record setting information to be executed by an image processing apparatus. First, the main control unit 400 of an image processing apparatus 20 detects whether or not an instruction about changing the job history record setting information is made in accordance with a user's operation input (step S21). Next, the main control unit 400 confirms the content of changes in job history record setting information (step S22). Subsequently, the main control unit 400 queries the main control unit 600 of the policy server 40 about the job execution limit information for the job corresponding to the job history record setting information for which a change has been instructed (step S23). The main control unit 600, which has received the query from the main control unit 400, of the policy server 40, makes a response to the query, and transmits the job execution limit information to the main control unit 400 of the image processing apparatus 20 (step S30).

Next, the main control unit 400 determines whether or not the changed job history record setting information indicates that the job history information is not to be recorded on the image forming apparatus 10 (step S24). When the changed job history record setting information indicates that the job history information is to be recorded on the image forming apparatus 10, the main control unit 400 performs the following processing with reference to the job execution limit information that has been transmitted from the policy server 40 in step S30. The main control unit 400 determines whether or not the job execution limit information indicates that the job execution limit information corresponding to the execution of the job is not limited (step S25). When the job execution limit information indicates that the job execution limit information corresponding to the execution of the job is not limited, the main control unit 400 transmits the job history record setting information to the main control unit 100 of the image forming apparatus 10 (step S28). The main control unit 100 of the image forming apparatus 10 sets the job history record setting information, which has been transmitted from the image processing apparatus 20 in step S28, to the setting control unit 105. With this arrangement, the changed job history record setting information is set in the image forming apparatus 10.

When the job execution limit information indicates that the execution of the job is limited, the image forming apparatus 10 does not generate job history information. Thus, in this case, the main control unit 400 provides a warning notification to a user (step S27), and thus the job history record setting information set in the image forming apparatus 10 is not changed.

When the changed job history record setting information indicates that the job history information is not to be recorded on the image forming apparatus 10, the main control unit 400 performs the following processing with reference to the job execution limit information that has been transmitted from the policy server 40 in step S30. The main control unit 400 determines whether or not the job execution limit information indicates that the job execution limit information corresponding to the execution of the job is not limited (step S26). When the job execution limit information indicates that the execution of the job is limited, the process advances to step S28.

When the job execution limit information indicates that the execution of the job is not limited, a failure in acquiring the job history information may occur on the data server 30.

Thus, in this case, the main control unit 400 provides a warning notification to a user (step S29), and thus the job history record setting information set in the image forming apparatus 10 is not changed.

For example, when the changed job history record setting information indicates that the job history information for the FAX transmission job is not recorded (step S24) and thus the execution of the job is not limited (step S26), a warning notification is provided (step S29). Also in the case of another job (e.g., copying, printing, scanning, and the like) in which the job corresponding to the changed job history record setting information is different from FAX transmission, the process is performed in a similar manner.

As described with reference to FIG. 6, when an instruction about changing the job history record setting information is made, the image processing apparatus 20 determines whether or not the changed job history record setting information indicates that the job history information is not to be recorded on the image forming apparatus 10 (step S24). When the changed job history record setting information indicates that the job history information is not to be recorded on the image forming apparatus 10, the image processing apparatus 20 determines whether or not the execution of the job corresponding to the job history information is limited with reference to the job execution limit information (step S26). Then, when the execution of the job corresponding to the job history information is not limited, the image processing apparatus 20 stops the change of the job history record setting information (step S29). Thus, the data server 30 can acquire the job history information for the job executed by the image forming apparatus 10, whereby any failure in acquiring the job history information can be prevented.

According to the information processing apparatus of the present embodiment, when the job execution limit relating to image processing is removed, any failure in acquiring the job history information corresponding to the job can be prevented.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298416 filed Dec. 28, 2009, which is hereby incorporated by reference herein in its entirety.

What is claimed is:

1. An information processing apparatus communicating with an image forming apparatus and a server and recording job history information including image data corresponding to a job according to an execution of the job, the information processing apparatus comprising: at least a processor, functioning as:

a receiving unit configured to receive an instruction about changing record setting information for a first job type, wherein record setting information for a job type indicates whether or not job history information is to be recorded for executed jobs of the job type;

an acquisition unit configured to acquire, from the server, limit information corresponding to the first job type in response to receiving the instruction, wherein limit information of a job type indicates whether or not execution of jobs of the job type is permitted;

a setting unit configured to set, in the image forming apparatus, the changed record setting information in response to determining the changed record setting information indicates the job history information for jobs of the first type is not to be recorded and the acquired limit information indicates that the execution of jobs of the first job type is not permitted; and a notification unit configured to provide a warning notification in response to determining the changed record setting information indicates the job history information for jobs of the first type is not to be recorded and the acquired limit information indicates that the execution of jobs of the first job type is permitted, wherein providing the warning notification stops the change of the record setting information.

2. The information processing apparatus according to claim 1, wherein, the notification unit is further configured to provide a warning notification in response to determining the changed record setting information indicates the job history information for jobs of the first type is to be recorded and the acquired limit information indicates that the execution of jobs of the first job type is not permitted.

3. The information processing apparatus according to claim 1, wherein the setting unit is further configured to set, in the image forming apparatus, the changed record setting information in response to determining the changed record setting information indicates the job history information for jobs of the first type is to be recorded and the acquired limit information indicates that the execution of jobs of the first job type is permitted.

4. A control method in an information processing apparatus communicating with an image forming apparatus and a server and recording job history information including image data corresponding to a job according to an execution of the job, and comprising at least a processor, the method comprising:

receiving an instruction about changing record setting information for a first job type, wherein record setting information for a job type indicates whether or not job history information is to be recorded for executed jobs of the job type;

acquiring, from the server, limit information corresponding to the first job type in response to receiving the instruction, wherein limit information of a job type indicates whether or not execution of jobs of the job type is permitted;

setting, in the image forming apparatus, the changed record setting information in response to determining the changed record setting information indicates the job history information for jobs of the first type is not to be recorded and the acquired limit information indicates that the execution of jobs of the first job type is not permitted; and providing a warning notification in response to determining the changed record setting information indicates the job history information for jobs of the first type is not to be recorded and the acquired limit information indicates that the execution of jobs of the first job type is permitted, wherein providing the warning notification stops the change of the record setting information.

5. A non-transitory storage medium on which is stored a computer program for making a processor execute a control method in an information processing apparatus communicating with an image forming apparatus and a server and recording job history information including image data corresponding to a job according to an execution of the job, the method comprising:

receiving an instruction about changing record setting information for a first job type, wherein record setting information for a job type indicates whether or not job history information is to be recorded for executed jobs of the job type;

acquiring, from the server, limit information corresponding to the first job type in response to receiving the instruction, wherein limit information of a job type indicates whether or not execution of jobs of the job type is permitted;

setting, in the image forming apparatus, the changed record setting information in response to determining the changed record setting information indicates the job history information for jobs of the first type is not to be recorded and the acquired limit information indicates that the execution of jobs of the first job type is not permitted; and providing a warning notification in response to determining the changed record setting information indicates the job history information for jobs of the first type is not to be recorded and the acquired limit information indicates that the execution of jobs of the first job type is permitted, wherein providing the warning notification stops the change of the record setting information.

* * * * *